US010824769B2

(12) United States Patent
Liu et al.

(10) Patent No.: US 10,824,769 B2
(45) Date of Patent: Nov. 3, 2020

(54) METHODS, APPARATUS, AND COMPUTER PROGRAM PRODUCTS FOR PROTECTING SENSITIVE DATA

(71) Applicant: International Business Machines Corporation, Armonk, NY (US)

(72) Inventors: Lan Zhe Liu, Beijing (CN); Wei Ge, Beijing (CN); Guang Han Sui, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/150,253

(22) Filed: Oct. 2, 2018

(65) Prior Publication Data

US 2020/0104539 A1 Apr. 2, 2020

(51) Int. Cl.
*G06F 21/84* (2013.01)
*G06F 21/60* (2013.01)
*G06F 21/62* (2013.01)

(52) U.S. Cl.
CPC ............ *G06F 21/84* (2013.01); *G06F 21/629* (2013.01); *G06F 21/6245* (2013.01); *G06F 21/60* (2013.01); *G06F 2221/032* (2013.01); *G06F 2221/0748* (2013.01)

(58) Field of Classification Search
CPC .... G06F 21/84; G06F 21/6245; G06F 21/629; G06F 2221/032; G06F 21/60; G06F 21/62; G06F 2221/0748
See application file for complete search history.

(56) References Cited

U.S. PATENT DOCUMENTS

| 8,448,260 B1* | 5/2013 | Hansen .................. G06F 21/62 726/27 |
| 9,275,255 B2 | 3/2016 | Singh et al. |
| 9,406,157 B2* | 8/2016 | Liu .......................... G06T 11/60 |
| 9,514,333 B1* | 12/2016 | Patel .................. G06F 21/6245 |
| 9,600,688 B2 | 3/2017 | Buck |

(Continued)

FOREIGN PATENT DOCUMENTS

| CN | 103425449 A | 12/2013 |
| CN | 107862208 A | 3/2018 |
| WO | 2015094310 A1 | 6/2015 |

OTHER PUBLICATIONS ip.com, "A Method to Improve Privacy by Face Recognition and Eye Tracking", ip.com Disclosure No. IPCOM000246640D, Jun. 23, 2016, p. 1.

(Continued)

*Primary Examiner* — Jayesh M Jhaveri
(74) *Attorney, Agent, or Firm* — Kunzler Bean & Adamson

(57) ABSTRACT

Methods that can protect sensitive data are provided. One method includes determining, by a processor, whether a user is focusing on an obscured set of sensitive data displayed on a computing device, clarifying the obscurity of a portion of the displayed set of sensitive data in response to determining that the user focusing on the portion of the displayed set of sensitive data, and maintaining the obscurity of one or more other portions of the displayed set of sensitive data in response to determining that the user not focusing on the one or more other portions of the displayed set of sensitive data. Apparatus and computer program products that can include, perform, and/or implement the methods are also provided.

20 Claims, 19 Drawing Sheets

(56) References Cited

U.S. PATENT DOCUMENTS

| | | | |
|---|---|---|---|
| 9,886,598 B2 | 2/2018 | Ziaja et al. | |
| 9,898,619 B1* | 2/2018 | Hadsall | G06F 21/60 |
| 9,977,909 B1* | 5/2018 | Austin | G06F 3/04883 |
| 10,521,605 B1* | 12/2019 | Scuderi | G06F 21/84 |
| 2010/0205667 A1* | 8/2010 | Anderson | G06F 3/017 |
| | | | 726/19 |
| 2011/0202850 A1* | 8/2011 | Chan | G06F 21/606 |
| | | | 715/745 |
| 2013/0307870 A1* | 11/2013 | Ashbrook | G06F 21/84 |
| | | | 345/629 |
| 2013/0321452 A1* | 12/2013 | Kawalkar | G06F 21/84 |
| | | | 345/629 |
| 2016/0379010 A1* | 12/2016 | Farkash | G06F 21/6245 |
| | | | 726/1 |
| 2018/0033171 A1* | 2/2018 | Rakshit | F16H 57/0483 |
| 2018/0285592 A1* | 10/2018 | Sharifi | G06F 21/6245 |

OTHER PUBLICATIONS

Schneier, "Gaze Tracking Software Protecting Privacy", Schneier on Security, Jul. 14, 2009, pp. 1-10.

* cited by examiner

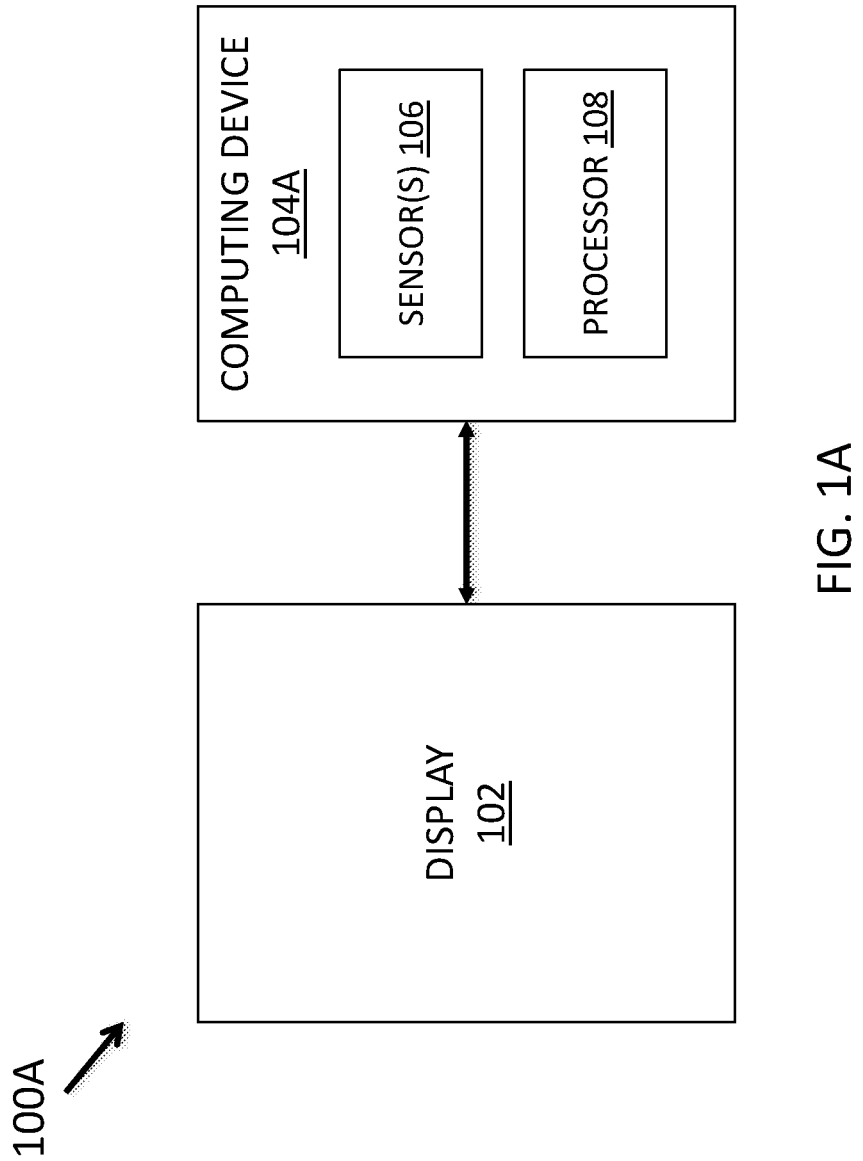

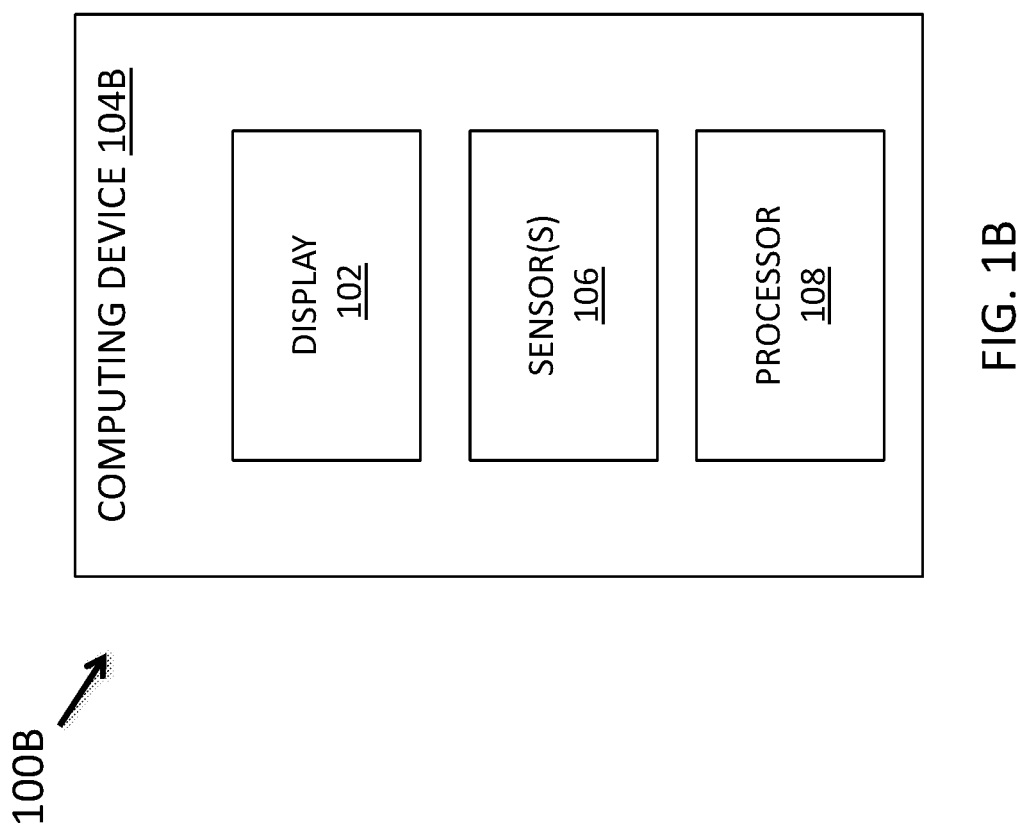

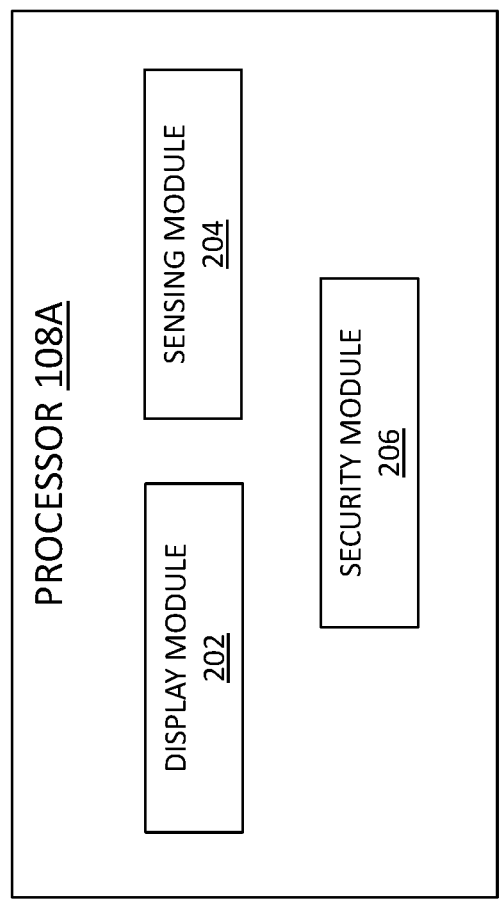

Time T0

120

Dear Sir or Madam:

We are writing to request a visa to Canada for Mr. Smith (Data of Birth: 1985-03-12, Passport Number: E123456789).

Mr. Smith is employed by ACME, Inc. as a software engineer.

Mr. Smith began working for ACME, Inc. since April 1, 2010 and has a current monthly salary of $10,987.

FIG. 3A

Time T1

120

Dear Sir or Madam:

We are writing to request a visa to Canada for Mr. Smith (Data of Birth: ▉▉▉).

Mr. Smith is employed by ACME, Inc. as a software engineer.

Mr. Smith began working for ACME, Inc. since April 1, 2010 and has a current monthly salary of ▉▉▉.

FIG. 3B

Time T2

120

Dear Sir or Madam:

We are writing to request a visa to Canada for Mr. Smith (Data of Birth: ██ Passport Number: E123456789).

Mr. Smith is employed by ACME, Inc. as a software engineer.

Mr. Smith began working for ACME, Inc. since April 1, 2010 and has a current monthly salary of ██

FIG. 3C

Time T3

Dear Sir or Madam:

We are writing to request a visa to Canada for Mr. Smith (Data of Birth: ███. Passport Number: ███ Mr. Smith is employed by ACME, Inc. as a software engineer.

Mr. Smith began working for ACME, Inc. since April 1, 2010 and has a current monthly salary of $10,987.

Time T4

120

Dear Sir or Madam:

We are writing to request a visa to Canada for Mr. Smith (Data of Birth: 1985-03-12, Passport Number: ███).

Mr. Smith is employed by ACME, Inc. as a software engineer.

Mr. Smith began working for ACME, Inc. since April 1, 2010 and has a current monthly salary of ███.

FIG. 3E

Time T5

120

Dear Sir or Madam:

We are writing to request a visa to Canada for Mr. Smith (Data of Birth: ██████).

Mr. Smith is employed by ACME, Inc. as a software engineer.

Mr. Smith began working for ACME, Inc. since April 1, 2010 and has a current monthly salary of ██████.

FIG. 3F

Time T0

120

Dear Sir or Madam:

We are writing to request a visa to Canada for Mr. Smith (Data of Birth: ███ Passport Number: E123456789).

Mr. Smith is employed by ACME, Inc. as a software engineer.

Mr. Smith began working for ACME, Inc. since April 1, 2010 and has a current monthly salary of ███

FIG. 4A

Time T1

Dear Sir or Madam:

We are writing to request a visa to Canada for Mr. Smith (Data of Birth: ██████). Passport Number: ██████ Mr. Smith is employed by ACME, Inc. as a software engineer.

Mr. Smith began working for ACME, Inc. since April 1, 2010 and has a current monthly salary of ██████

Time T2

120

Dear Sir or Madam:

We are writing to request a visa to Canada for Mr. Smith (Data of Birth: ███ Passport Number: E123456789).

Mr. Smith is employed by ACME, Inc. as a software engineer.

Mr. Smith began working for ACME, Inc. since April 1, 2010 and has a current monthly salary of ███

FIG. 4C

METHODS, APPARATUS, AND COMPUTER PROGRAM PRODUCTS FOR PROTECTING SENSITIVE DATA

FIELD

The subject matter disclosed herein relates to computing systems and devices and, more particularly, relates to methods, apparatus, and computer program products that can protect sensitive data.

BACKGROUND

Individuals use computing devices to perform many tasks that require private and/or sensitive data to be displayed on the computing devices. With the rise of criminal activity, it is becoming more important to protect sensitive data displayed on computing devices from being viewed by unauthorized users and/or third parties.

BRIEF SUMMARY

Methods, apparatus, and computer program products that can protect sensitive data are provided. One method includes determining, by a processor, whether a user is focusing on an obscured set of sensitive data displayed on a computing device, clarifying the obscurity of a portion of the displayed set of sensitive data in response to determining that the user focusing on the portion of the displayed set of sensitive data, and maintaining the obscurity of one or more other portions of the displayed set of sensitive data in response to determining that the user not focusing on the one or more other portions of the displayed set of sensitive data.

An apparatus includes a display module that obscures display of a set of sensitive data on a display of a computing device, a sensing module that detects whether a user is focusing on the displayed set of sensitive data, and a security module that clarifies the obscurity of a portion of the displayed set of sensitive data in response to the user focusing on the portion of the displayed set of sensitive data and maintains the obscurity of one or more other portions of the displayed set of sensitive data in response to the user not focusing on the other portions of the displayed set of sensitive data. In various embodiments, at least a portion of the modules include one or more of a set of hardware circuits, a set of programmable hardware devices, and executable code stored on a set of non-transitory computer-readable storage mediums.

One computer program product includes program instructions embodied therewith and executable by a processor. The program instructions cause the processor to determine whether a user is focusing on an obscured set of sensitive data displayed on a computing device, clarify the obscurity of a portion of the displayed set of sensitive data in response to determining that the user focusing on the portion of the displayed set of sensitive data, and maintain the obscurity of one or more other portions of the displayed set of sensitive data in response to determining that the user not focusing on the one or more other portions of the displayed set of sensitive data.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIG. 1A is a block diagram of one embodiment of a computing system that can protect sensitive data displayed therein;

FIG. 1B is a block diagram of one embodiment of a computing device that can protect sensitive data displayed thereon;

FIGS. 2A and 2B are block diagrams of various embodiments of a processor included in the computing system of FIG. 1A and/or the computing device of FIG. 1B;

FIGS. 3A through 3F are timing diagrams of one embodiment of operations that protect sensitive data displayed on a display for the computing system of FIG. 1A and/or the computing device of FIG. 1B;

FIGS. 4A through 4C are timing diagrams of an additional or alternative embodiment of operations that protect sensitive data displayed on a display for the computing system of FIG. 1A and/or the computing device of FIG. 1B;

DETAILED DESCRIPTION

Figure 2B:
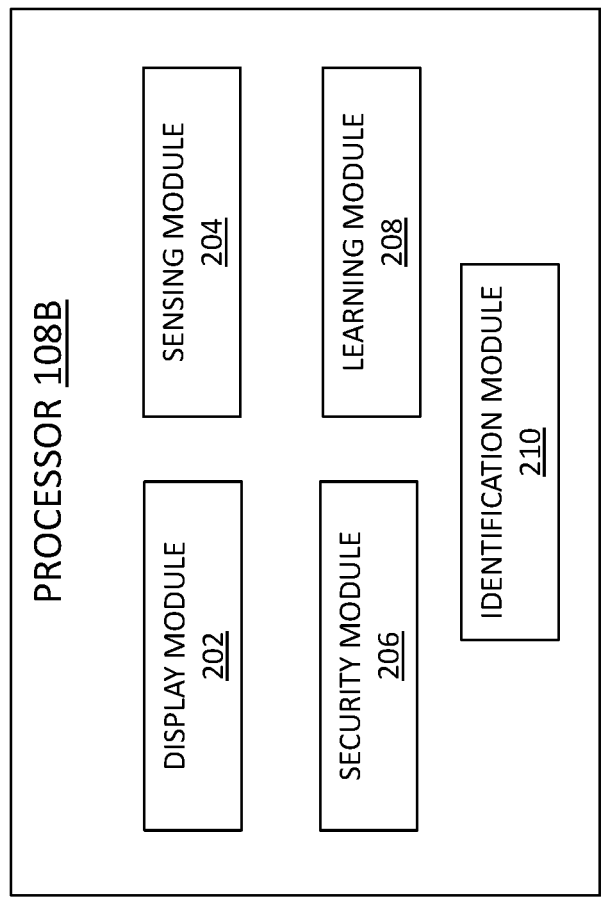

Disclosed herein are various embodiments providing methods, systems, and computer program products that can merge protocols for storage networks and systems. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1A is a block diagram of one embodiment of a computing device and/or system 100A. At least in the illustrated embodiment, the computing system 100A includes, among other components, a display 102 coupled to and/or in communication with a computing system 104A.

A display 102 may include any suitable display device and/or system that is known or developed in the future that can display data (e.g., sensitive data and/or non-sensitive data). Examples of a display 102 can include, but are not limited to, a cathode ray tube (CRT) display, a liquid crystal display (LCD) display, a thin film transistor LCD (TFT-LCD), a light-emitting diode (LED) display, an organic light-emitting diode (OLED) display, a projector (e.g., digital light processing (DLP)) display, and a plasma display panel, among other types of displays that are possible and contemplated herein.

A computing system 104A may include any suitable computing device and/or system that can process data (e.g., sensitive and/or non-sensitive data). Examples of a computing system 104A can include, but are not limited to, an automatic teller machine (ATM), a desktop computing device, a laptop computing device, a shopping terminal, and a credit/debit card processing terminal, etc., among other types of computing devices that can process data that may be displayed on a display 102 that are possible and contemplated herein. At least in the illustrated embodiment, a computing system 104A includes, among other components, a set of sensors 106 and a processor 108.

A sensor 106 may include any suitable sensing device and/or system that can detect an individual using a computing system 100A or computing device 100B and/or when one or more third parties are in the same environment as the computing system 100A or computing device 100B. In various embodiments, a sensor 106 can detect whether the user and/or the one or more third parties is/are viewing and/or looking at the sensitive data displayed on a display 102. Specifically, a sensor 106 can locate, determine, and/or discern the focus and/or gaze of the eye(s) of one or more individuals.

In various embodiments, a sensor 106 includes a video camera. In additional or alternative embodiments, a sensor 106 can include a still camera. In other embodiments, a sensor 106 can include hardware and/or software that can locate, determine, and/or discern the focus and/or gaze of the eye(s) of the user and/or one or more third parties in the same environment as the computing system 100A or computing device 100B.

A processor 108 may include any suitable processing hardware and/or software capable of performing computer processes, functions, and/or algorithms. In various embodiments, a processor 108 can protect sensitive data that is being displayed on a display 102, as discussed elsewhere herein (see e.g., FIGS. 2A and 2B). That is, a processor 108 can ensure that sensitive data displayed on a display 102 is only viewable and/or readable by an authorized user of the computing system 100A. In other words, a processor 108 can ensure that sensitive data displayed on a display 102 is not viewable/readable by an unauthorized user of the computing system 100A and/or a third party that is attempting to view the sensitive data while an authorized user is viewing the sensitive data.

Referring to FIG. 1B, FIG. 1B is a block diagram of another embodiment of a computing device and/or system 100B. At least in the illustrated embodiment, the computing device 100B includes, among other components, a display 102, a set of sensors 106, and a processor 108 similar to the various embodiments of a computing system 100A discussed elsewhere herein.

A computing device 104B may include any suitable computing device and/or system that can process data (e.g., sensitive and/or non-sensitive data). Examples of a computing device 104B can include, but are not limited to, a mobile/cellular/smart phone, a computing tablet, a personal digital device (PDA), a smartwatch, etc., among other types of computing devices that are possible and contemplated herein.

With reference to FIG. 2A, FIG. 2A is a block diagram of one embodiment of a processor 108A that can protect sensitive data displayed on a display 102. At least in the illustrated embodiment, the processor 108A includes, among other components, a display module 202, a sensing module 204, and a security module 206.

A display module 202 may include any suitable hardware and/or software that can facilitate display of data (e.g., sensitive data and insensitive data) on a display 102. In various embodiments, a display module 202 can obscure display of the sensitive data on the display 102. In some embodiments, a display module 202 can include a setting that, by default, obscures display of each portion of the sensitive data on the display 102.

The sensitive data can be obscured utilizing any suitable technique that can prevent an individual from being able to read and/or decipher the contents of a set of sensitive data displayed on a display 102. Examples of obscurity sensitive data includes, but are not limited to, blacking out the sensitive data, blurring the sensitive data, removing or blanking the sensitive data, making the sensitive data invisible, fuzzy out the sensitive data, encrypting the sensitive data, and/or scrambling the sensitive data, etc., among other techniques that can prevent an individual from reading and/or deciphering the contents of a set of sensitive data.

A sensing module 204 may include any suitable hardware and/or software that can manage and/or control the various sensing functions of the set of sensors 106. In one embodiment, the sensing module 204 can operate one or more sensors 106 on a continuous or substantially continuous basis. For example, the sensing module 204 can operate the one or more sensors 106 in response to detecting that a user is using and/or interacting with a computing system 100A or computing device 100B and/or in response to the sensor(s) 106 detecting that one or more third parties are in the same environment as the computing system 100A or computing device 100B.

In various embodiments, a sensing module 204 can detect whether one or more individuals (e.g., an authorized user, an unauthorized user, and/or a third party, etc.) is/are focusing on and/or looking at sensitive data displayed on a display 102. That is, a sensing module 204 can detect whether the individual(s) is/are viewing and/or looking at the sensitive data displayed on a display 102. Specifically, a sensing module 204 can locate, determine, and/or discern the focus and/or gaze of the eye(s) of the one or more individuals.

A security module 206 may include any suitable hardware and/or software that can protect sensitive data being displayed on a display 102. In various embodiments, a security module 206 can clarify the obscurity of a portion of the sensitive data displayed on a display 102 in response to an authorized user viewing and/or looking at the portion of the sensitive data. In additional or alternative embodiments, a security module 206 can maintain the obscurity of one or more portions of the sensitive data that the user is not currently looking at and/or viewing.

For example, for a display 102 displaying two portions of sensitive data in which the user is viewing a first one of the portions, a security module 206 can clarify the first portion of the security data that the user is currently viewing while maintaining the obscurity of the second portion of the security data that the user is not currently looking at and/or viewing. In continuing the non-limiting example, the security module 206 can re-obscure the first portion of the security data and clarify the second portion of the security data in response to the user changing his/her focus from the first portion of the security data to the second portion of the security data. In another non-limiting example, a security module 206 can maintain the obscurity of both the first portion and the second portion of the security data in response to the user not viewing and/or looking at the first portion or the second portion of the sensitive data.

In various embodiments, a security module 206 can maintain the obscurity of each portion of the sensitive data displayed on a display 102 in response to a determination that the user is an unauthorized user. In some embodiments, a security module 206 facilitates and/or maintains the default setting that obscurely displays the sensitive data in response to the determination that the user is an unauthorized user.

In additional or alternative embodiments, a security module 206 can re-obscure a clarified portion of the sensitive data displayed on a display 102 in response to a determination that a third party in the same environment as the computing system 100A or computing device 100B is looking at and/or attempting to look at the clarified portion of the sensitive data being displayed on the display 102. Here, the portion of the sensitive data was clarified in response to an authorized user viewing and/or looking at the portion of the sensitive data. Further, the security module 206 can re-clarify the re-obscured portion of the sensitive data in response to a further determination that the third party is no longer looking at and/or no longer attempting to look at the portion of the sensitive data being displayed on the display 102.

Referring to FIG. 2B, FIG. 2B is a block diagram of another embodiment of a processor 108B that can protect sensitive data displayed on a display 102. The processor 108B includes, among other components, a display module 202, a sensing module 204, and a security module 206 similar to the processor 108A discussed elsewhere herein. At least in the illustrated embodiment, a processor 108B can further include a learning module 208 and an identification module 210.

A learning module 208 may include any suitable hardware and/or software that can determine sensitive data and/or non-sensitive data (e.g., insensitive data and/or public data) from a set of data. In some embodiments, a learning module 208 may include and/or perform one or more machine learning techniques and/or algorithms to learn and/or make a determination of what constitutes sensitive data and/or non-sensitive data.

In various embodiments, a learning module 208 can automatically learn/determine sensitive data and/or can receive user input identifying types of sensitive data. Examples of sensitive data can include, but are not limited to, bank account information (account number, balance, transaction history, etc.), credit/debit card information (account number, balance, transaction history, personal identification number (PIN), etc.), social security number, passport number, salary/income, tax information, contact information (e.g., physical address, phone number, email address, etc.), license information (e.g., driver's license, professional license, etc.), legal information (e.g., title, ownership, citizenship, lawsuits, etc.), and personal information (e.g., relatives, date of birth, maiden name, mother's maiden name, birth place, political affiliation, religious affiliation, etc.), etc., among other types of sensitive data and/or information that a user may desire to keep private.

An identification module 210 may include any suitable hardware and/or software that can identify and discern unauthorized users and one or more authorized users. An identification module 210 can discern between authorized users and unauthorized users using one or more biometrics detected by the set of sensors 106. For example, authorized users and unauthorized users can be identified using one or more visual characteristics detected by the sensor(s) 106.

In various embodiments, an identification module 204 can identify and/or determine whether a user is an authorized user or an unauthorized user based on sensor data generated by the sensor(s) 106. In some embodiments, a user can be identified as an authorized user or an unauthorized user by matching one or more characteristics detected by the sensor(s) 106 and corresponding characteristics for authorized users. That is, if the one or more characteristics match, the user is an authorized user, while a non-match identifies the user as an unauthorized user.

With reference to FIGS. 3A through 3F, FIGS. 3A through 3F are timing diagrams of one embodiment of operations that protect sensitive data displayed on a display 102 for a computing system 100A or a computing device 100B. In FIG. 3A, at set of raw data is displayed on the display 102 at time T0. That is, both sensitive data and insensitive data are freely displayed.

At time T1 (see FIG. 3B), sensitive data (e.g., date of birth, passport number, and salary/income data) are identified and obscured. In this example, the sensitive data is blacked out; however, other embodiments may obscure the sensitive data using any of the techniques for rendering sensitive data unreadable or indecipherable, as discussed elsewhere herein.

In FIG. 3C (e.g., a time T2), a security module 206 of a processor 108A or 108B clarifies the obscurity of the passport number in response to one or more sensors 106 in combination with a sensing module 204 determining/detecting that the user is focusing on the passport number. In this example, the security module 206 clarifies (e.g., un-blacks out) the passport number so that the user can read the passport number as the user looks at and/or focuses on the passport number. Further, the security module 206 maintains and/or continues to black out the other portions of sensitive data (e.g., the date of birth and salary/income data) while the user is looking at the passport data because the user is not looking at the date of birth and salary/income data.

At time T3 (see FIG. 3D), a security module 206 clarifies the obscurity of the salary/income data and re-obscures the passport number in response to one or more sensors 106 in combination with a sensing module 204 determining/detecting that the user is focusing on the salary/income data and no longer focusing on the passport number. In this example, the security module 206 clarifies (e.g., un-blacks out) the salary/income data and re-obscures (e.g., re-blacks out) the passport number so that the user can read the salary/income data as the user looks at and/or focuses on the salary/income data and the passport number is no longer readable and/or decipherable. Further, the security module 206 maintains and/or continues to black out the date of birth (e.g., the other portion of sensitive data) while the user is looking at the salary/income data because the user is not looking at the date of birth.

In FIG. 3E (e.g., at time T4), a security module 206 clarifies the obscurity of the date of birth and re-obscures the salary/income data in response to one or more sensors 106 in combination with a sensing module 204 determining/detecting that the user is focusing on the date of birth and no longer focusing on the salary/income data. In this example, the security module 206 clarifies (e.g., un-blacks out) the date of birth and re-obscures (e.g., re-blacks out) the salary/income data so that the user can read the date of birth as the user looks at and/or focuses on the date of birth and the salary/income data is no longer readable and/or decipherable. Further, the security module 206 maintains and/or continues to black out the passport number (e.g., the other portion of sensitive data) while the user is looking at the date of birth because the user is not looking at the salary/income data.

At time T5 (see FIG. 3F), a security module 206 re-obscures the date of birth in response to one or more sensors 106 in combination with a sensing module 204 determining/detecting that the user is no longer focusing on the date of birth. In this example, the security module 206 re-obscures (e.g., re-blacks out) the date of birth so that the date of birth is no longer readable and/or decipherable. Further, the security module 206 maintains and/or continues to black out the other portions of sensitive data (e.g., salary/income data and the passport number) because the user is not looking at the salary/income data and the passport number. That is, the security module 206 may return to the default setting in which all of the sensitive data is obscured because the user is not looking at and/or focusing on any of the sensitive data (e.g., the user is looking at non-sensitive data or is no longer using the computing system 100A or computing device 100B).

Referring to FIGS. 4A through 4C, FIGS. 4A through 4C are timing diagrams of an additional or alternative embodiment of operations that protect sensitive data displayed on a display 102 for a computing system 100A or a computing device 100B. In FIG. 4A (e.g., a time T1), an authorized user is looking at, viewing, and/or focusing on a portion of sensitive data (e.g., a passport number) displayed on the display 102, while the other portions of the sensitive data (e.g., the salary/income data and date of birth) are obscured.

At time T2 (see FIG. 4B), a security module 206 re-obscures the passport number in response to one or more sensors 106 in combination with a sensing module 204 determining/detecting that a third party is focusing on and/or attempting to view the passport number (e.g., the clarified sensitive data). In this example, the security module 206 re-obscures (e.g., re-blacks out) the passport number so that the passport number is not readable and/or decipherable by the third party (and the user). In addition to the sensitive data being protected, the user can also be alerted that a third party is viewing and/or attempting to view the sensitive data while the user is looking at the sensitive data. Further, the security module 206 maintains and/or continues to black out the salary/income data and date of birth (e.g., the other portions of sensitive data) while the third party is looking at and/or attempting to view the passport number.

In FIG. 4C (e.g., at time T3), a security module 206 re-clarifies the passport number in response to one or more sensors 106 in combination with a sensing module 204 determining/detecting that the third party is no longer focusing on and/or attempting to view the passport number (e.g., the clarified sensitive data) and the authorized user is looking at and/or viewing the passport number. In this example, the security module 206 re-clarifies (e.g., un-blacks out) the passport number so that the passport number is again readable and/or decipherable by the user. Further, the security module 206 maintains and/or continues to black out the salary/income data and date of birth (e.g., the other portions of sensitive data) while the user is looking at and/or focusing on the passport number because the user is not looking at the salary/income data and the date of birth.

Figure 5:
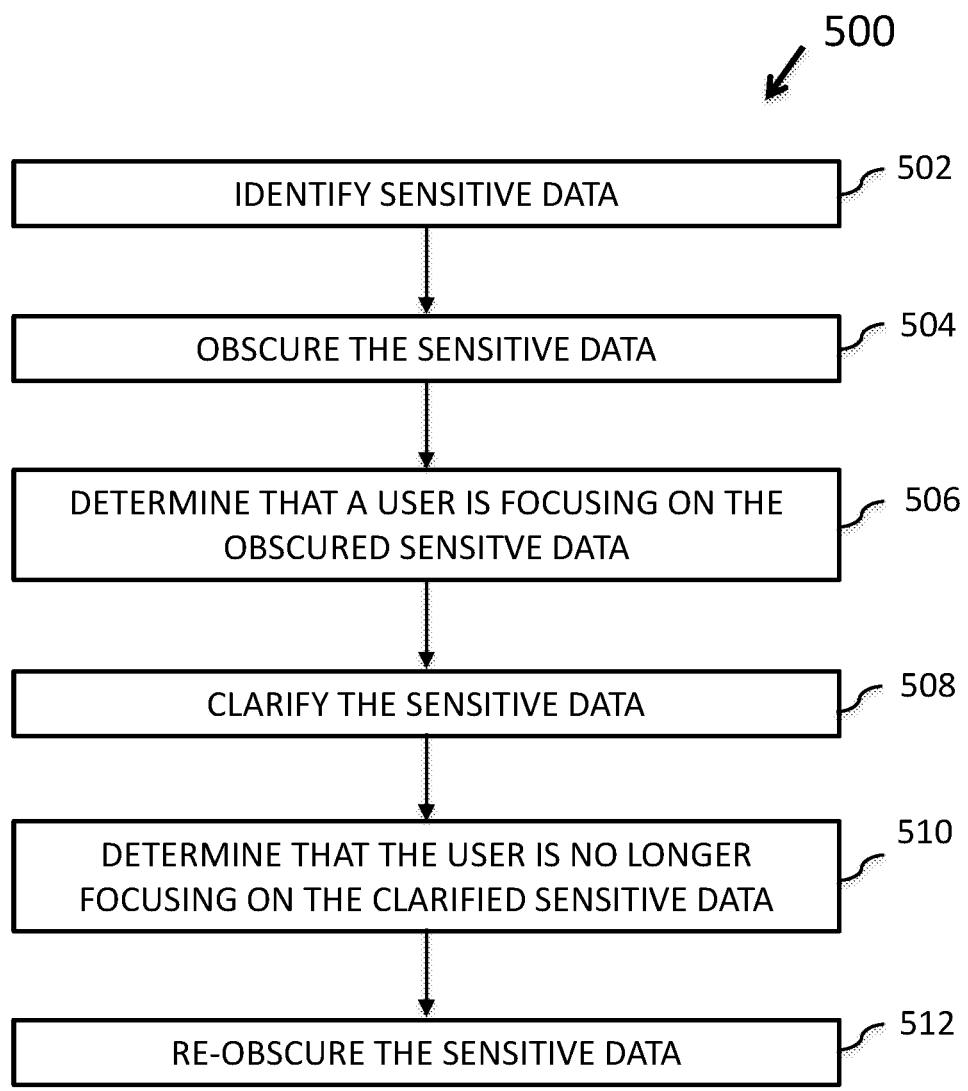
FIG. 5 is a schematic flowchart diagram illustrating one embodiment of a method for protecting sensitive data being displayed on a display.

With reference to FIG. 5, FIG. 5 is a schematic flow chart diagram illustrating one embodiment of a method 500 for protecting sensitive data being displayed on a display 102. At least in the illustrated embodiment, the method 500 can begin by a processor 108 (e.g., via an identification module 210) identifying sensitive data from a set of data (block 502).

The processor 108 can obscure each portion of the sensitive data (block 504). In some embodiments, the sensitive data can be obscured as part of a default setting. Further, the sensitive data can be obscured utilizing any of the obscuring techniques discussed elsewhere herein.

The processor 108 can determine (e.g., via one or more sensors 106 and/or a sensing module 204) that an authorized user is focusing on and/or looking at the obscured sensitive data (block 506). In response to determining that the user is focusing on and/or looking at the obscured sensitive data, the processor 108 can clarify the obscured sensitive data (block 508). The sensitive data can be clarified by performing one or more operations and/or techniques that can remove and/or reverse the technique that obscured the sensitive data, as discussed elsewhere herein.

The processor 108 can further determine (e.g., via the one or more sensors 106 and/or a sensing module 204) that the user is no longer focusing on and/or looking at the obscured sensitive data (block 510). In response to determining that the user is no longer focusing on and/or looking at the clarified sensitive data, the processor 108 can re-obscure the sensitive data (block 512).

Figure 6:
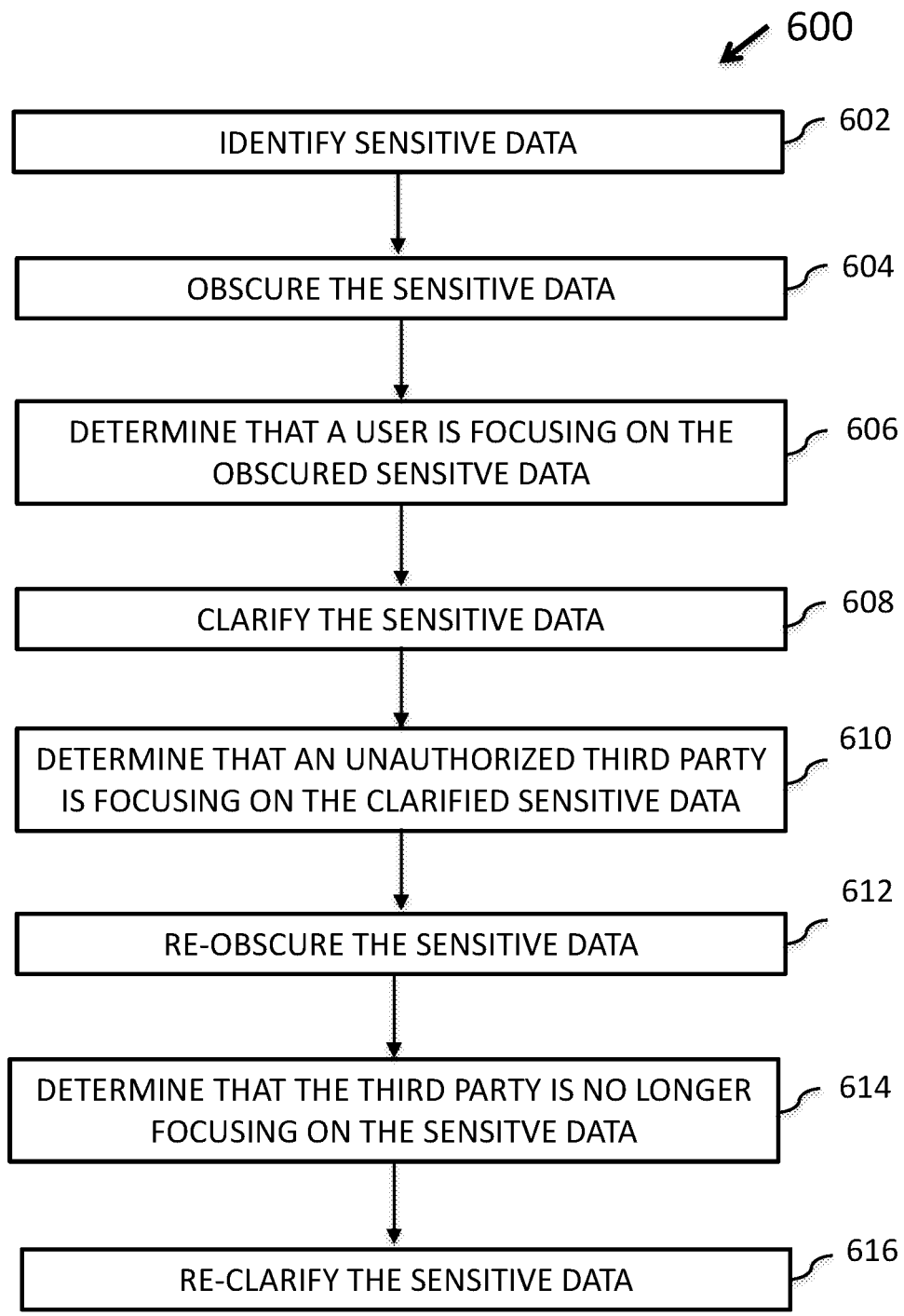
FIG. 6 is a schematic flowchart diagram illustrating another embodiment of a method for protecting sensitive data being displayed on a display.

Referring to FIG. 6, FIG. 6 is a schematic flow chart diagram illustrating another embodiment of a method 600 for protecting sensitive data being displayed on a display 102. At least in the illustrated embodiment, the method 600 can begin by a processor 108 (e.g., via an identification module 210) identifying sensitive data from a set of data (block 602).

The processor 108 can obscure each portion of the sensitive data (block 604). In some embodiments, the sensitive data can be obscured as part of a default setting. Further, the sensitive data can be obscured utilizing any of the obscuring techniques discussed elsewhere herein.

The processor 108 can determine (e.g., via one or more sensors 106 and/or a sensing module 204) that an authorized user is focusing on and/or looking at the obscured sensitive data (block 606). In response to determining that the user is focusing on and/or looking at the obscured sensitive data, the processor 108 can clarify the obscured sensitive data (block 608). The sensitive data can be clarified by performing one or more operations and/or techniques that can remove and/or reverse the technique that obscured the sensitive data, as discussed elsewhere herein.

The processor 108 can further determine (e.g., via the one or more sensors 106 and/or a sensing module 204) that an unauthorized third party is viewing and/or attempting to look at the sensitive data (block 610). In response to determining that the third party is viewing and/or attempting to look at the sensitive data, the processor 108 can re-obscure the sensitive data (block 612).

Further, the processor 108 can determine (e.g., via the one or more sensors 106 and/or a sensing module 204) that the third party is no longer viewing and/or attempting to look at the sensitive data (block 614). In response to determining that the third party is no longer viewing and/or attempting to look at the sensitive data, the processor 108 can re-clarify the sensitive data (block 616).

Figure 7:
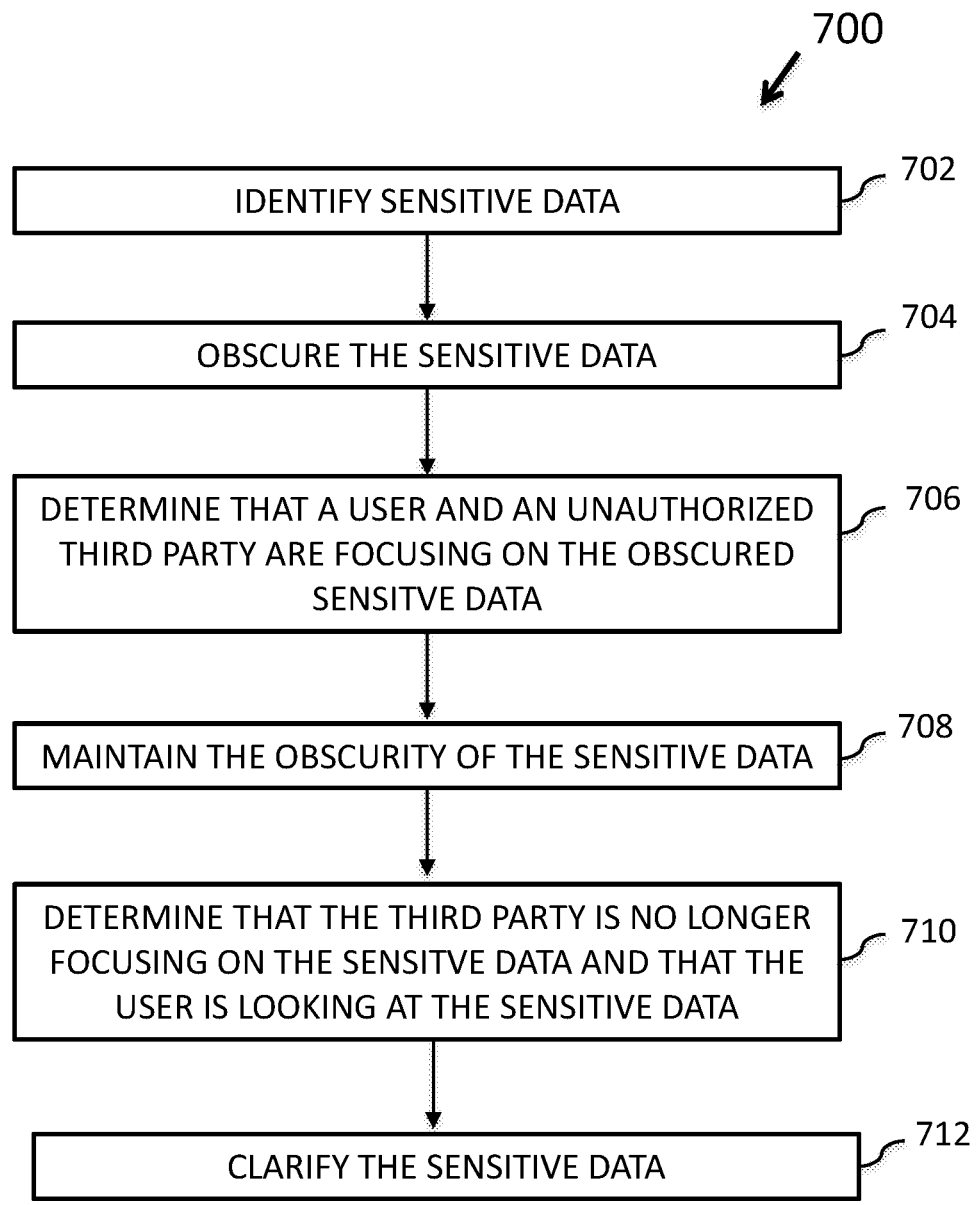
FIG. 7 is a schematic flowchart diagram illustrating yet another embodiment of a method for protecting sensitive data being displayed on a display.

With reference to FIG. 7, FIG. 7 is a schematic flow chart diagram illustrating yet another embodiment of a method 700 for protecting sensitive data being displayed on a display 102. At least in the illustrated embodiment, the method 700 can begin by a processor 108 (e.g., via an identification module 210) identifying sensitive data from a set of data (block 702).

The processor 108 can obscure each portion of the sensitive data (block 704). In some embodiments, the sensitive data can be obscured as part of a default setting. Further, the sensitive data can be obscured utilizing any of the obscuring techniques discussed elsewhere herein.

The processor 108 can determine (e.g., via one or more sensors 106 and/or a sensing module 204) that an authorized user is focusing on and/or looking at the obscured sensitive data and that an unauthorized third party is viewing and/or attempting to view the obscured sensitive data (block 706). In response to determining that the third party is viewing and/or attempting to look at the sensitive data, the processor 108 can maintain the obscurity of the sensitive data (block 708). Here, the obscurity is maintained even though an authorized user is looking at and/or viewing the obscured sensitive data.

Further, the processor 108 can determine (e.g., via the one or more sensors 106 and/or a sensing module 204) that the third party is no longer viewing and/or attempting to look at the sensitive data and that the user is looking at and/or viewing the sensitive data (block 710). In response to determining that the third party is no longer viewing and/or attempting to look at the sensitive data and that the user is looking at and/or viewing the sensitive data, the processor 108 can clarify the sensitive data (block 712).

Figure 8:
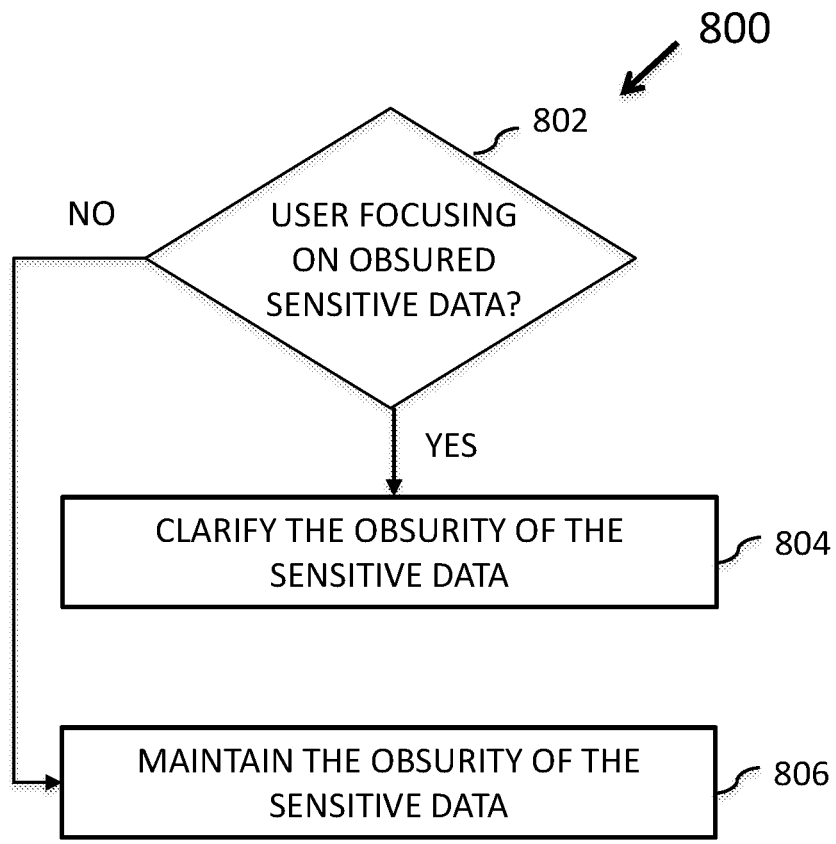
FIG. 8 is a schematic flowchart diagram illustrating still another embodiment of a method for protecting sensitive data being displayed on a display.

Referring to FIG. 8, FIG. 8 is a schematic flow chart diagram illustrating another embodiment of a method 800 for protecting sensitive data being displayed on a display 102. At least in the illustrated embodiment, the method 800 can begin by a processor 108 (e.g., via an identification module 210) determining whether an authorized user is looking at and/or viewing an obscured portion of sensitive data (block 802).

In response to determining that the user is looking at and/or viewing the obscured portion of the sensitive data (e.g., a "YES" in block 802), the processor 108 can clarify the portion of the sensitive data (block 804). In response to determining that the user is not looking at and/or not viewing the obscured portion of the sensitive data (e.g., a "NO" in block 802), the processor 108 can maintain the obscurity of the portion of the sensitive data (block 806).

Figure 9:
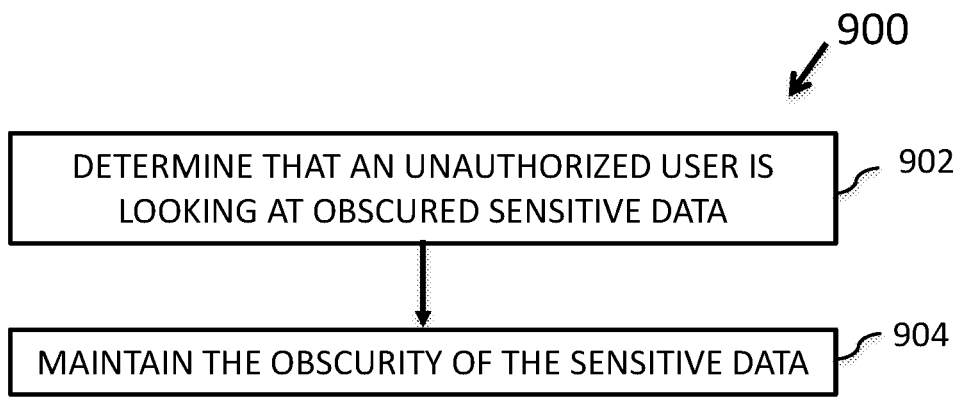
FIG. 9 is a schematic flowchart diagram illustrating an alternative embodiment of a method for protecting sensitive data being displayed on a display.

With reference to FIG. 9, FIG. 9 is a schematic flow chart diagram illustrating yet another embodiment of a method 900 for protecting sensitive data being displayed on a display 102. At least in the illustrated embodiment, the method 900 can begin by a processor 108 (e.g., via an identification module 210) determining that an unauthorized user is looking at and/or attempting to view obscured sensitive data (block 902). In response to the determination, the processor can maintain the obscurity of the sensitive data (block 904).

Figure 10:
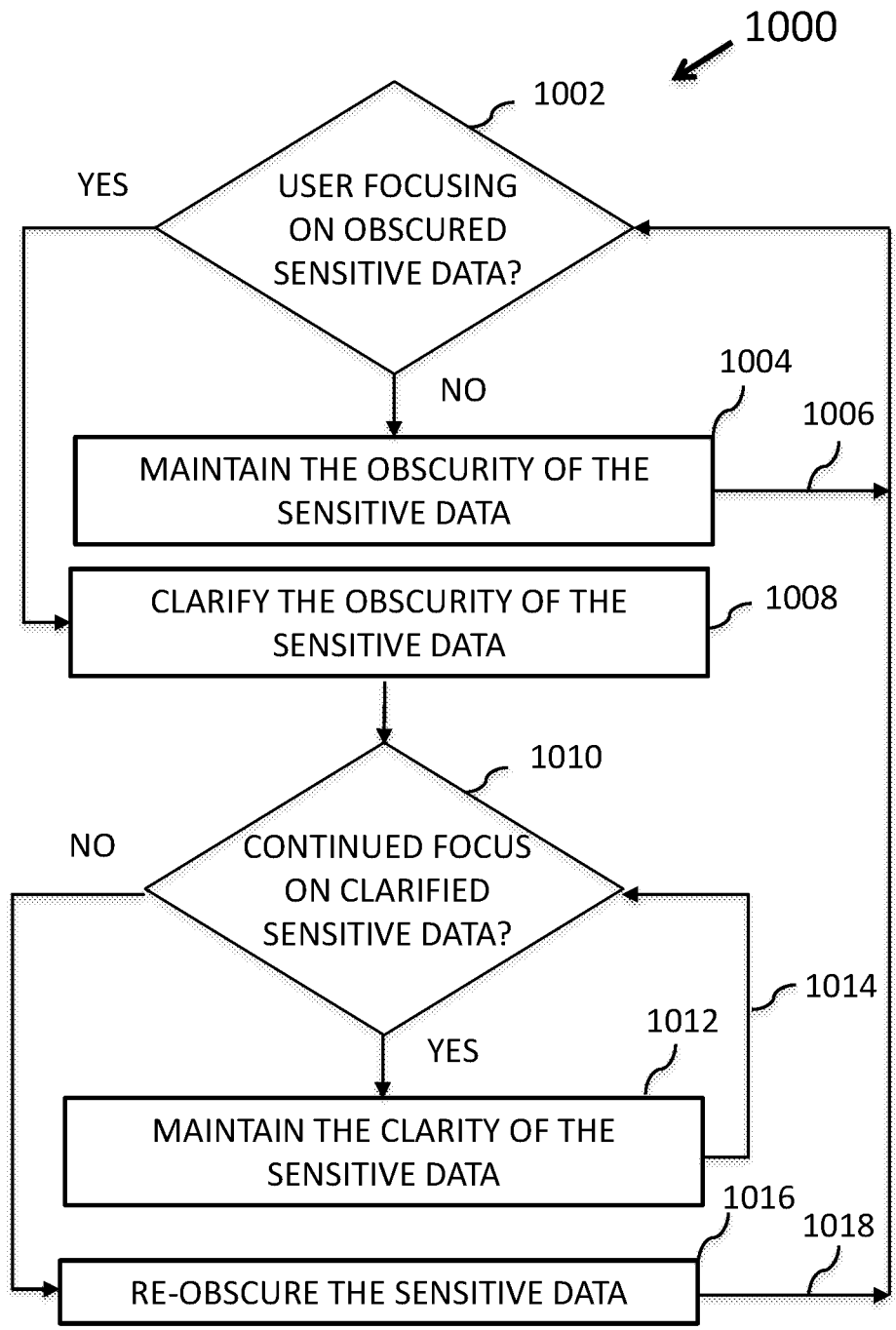
FIG. 10 is a schematic flowchart diagram illustrating another embodiment of a method for protecting sensitive data being displayed on a display.

Referring to FIG. 10, FIG. 10 is a schematic flow chart diagram illustrating still another embodiment of a method 1000 for protecting sensitive data being displayed on a display 102. At least in the illustrated embodiment, the method 1000 can begin by a processor 108 (e.g., via an identification module 210) determining whether an authorized user is looking at and/or focusing on an obscured portion of sensitive data (block 1002).

In response to determining that the user is not looking at and/or not focusing on the obscured portion of the sensitive data (e.g., a "NO" in block 1002), the processor 108 can maintain the obscurity of the portion of the sensitive data (block 1004). The processor 108 can then continue to determine whether an authorized user is looking at and/or focusing on an obscured portion of sensitive data (return 1006).

In response to determining that the user is looking at and/or focusing on the obscured portion of the sensitive data (e.g., a "YES" in block 1002), the processor 108 can clarify the obscurity of the portion of the sensitive data (block 1008). The processor can further determine whether the user is continuing to look at and/or focus on the clarified portion of the sensitive data (block 1010).

In response to determining that the user is continuing to look at and/or focus on the clarified portion of the sensitive data (e.g., a "YES" in block 1010), the processor 108 can maintain the clarity of the portion of the sensitive data (block 1012). The processor 108 can then continue to determine whether the user is continuing to look at and/or focus on the clarified portion of the sensitive data (return 1014).

In response to determining that the user is no longer looking at and/or focusing on the clarified portion of the sensitive data (e.g., a "NO" in block 1010), the processor 108 can re-obscure the portion of the sensitive data (block 1016). The processor 108 can then determine whether the user is looking at and/or focusing on an obscured portion of sensitive data (return 1018). Here, the determination subsequent to return 1018 can made with respect to the same portion of the sensitive data or another portion of the sensitive data.

Figure 11:
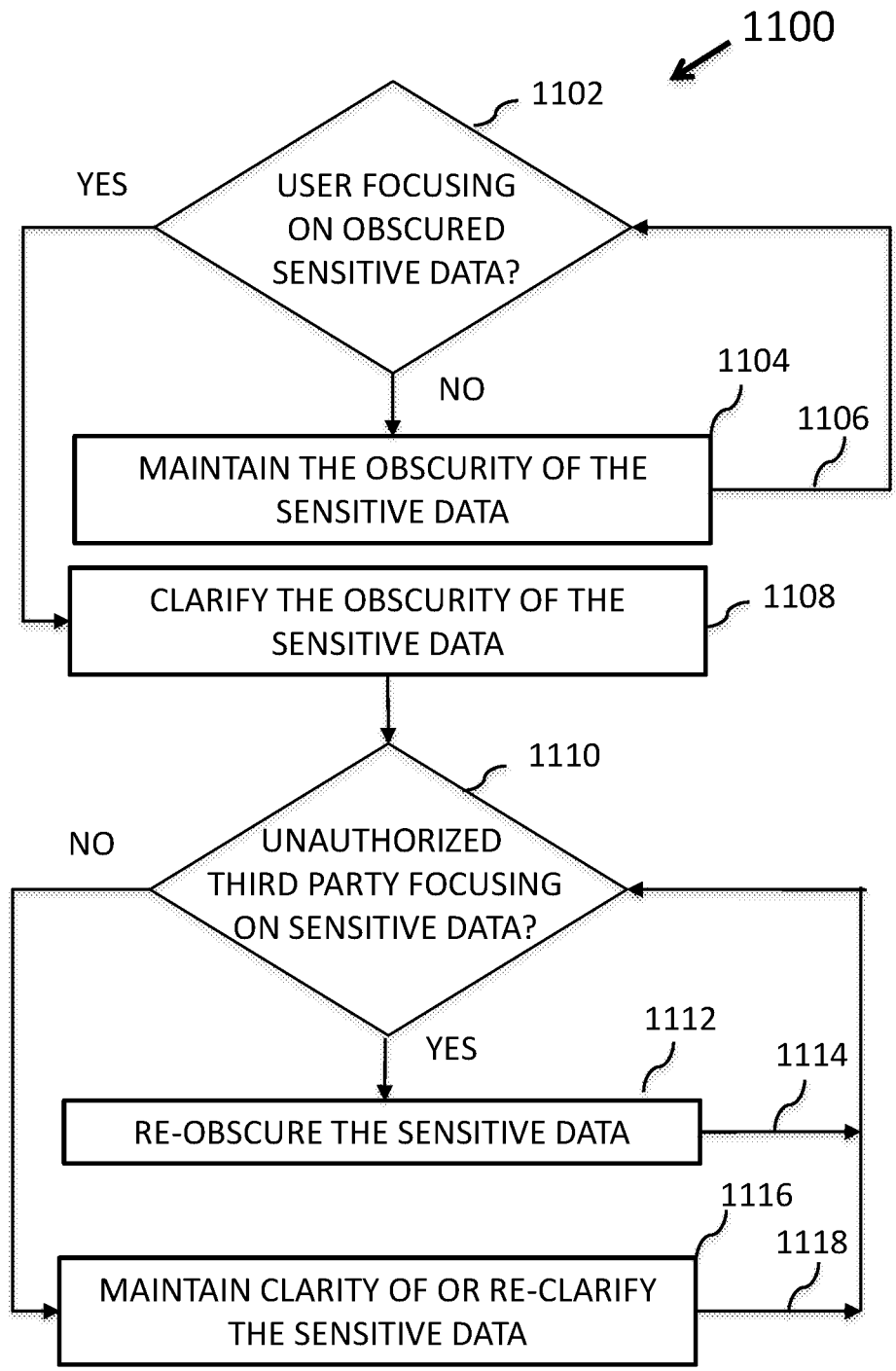
FIG. 11 is a schematic flowchart diagram illustrating yet another embodiment of a method for protecting sensitive data being displayed on a display.

With reference to FIG. 11, FIG. 11 is a schematic flow chart diagram illustrating another embodiment of a method 1100 for protecting sensitive data being displayed on a display 102. At least in the illustrated embodiment, the method 1100 can begin by a processor 108 (e.g., via an identification module 210) determining whether an authorized user is looking at and/or focusing on an obscured portion of sensitive data (block 1102).

In response to determining that the user is not looking at and/or not focusing on the obscured portion of the sensitive data (e.g., a "NO" in block 1102), the processor 108 can maintain the obscurity of the portion of the sensitive data (block 1104). The processor 108 can then continue to determine whether an authorized user is looking at and/or focusing on an obscured portion of sensitive data (return 1106).

In response to determining that the user is looking at and/or focusing on the obscured portion of the sensitive data (e.g., a "YES" in block 1102), the processor 108 can clarify the obscurity of the portion of the sensitive data (block 1108). The processor 108 can further determine whether an unauthorized third party is focusing on and/or attempting to look at the clarified portion of the sensitive data (block 1110).

In response to determining that the third party is focusing on and/or attempting to look at the clarified portion of the sensitive data (e.g., a "YES" in block 1110), the processor 108 can re-obscure the portion of the sensitive data (block 1112). The processor 108 can then continue to determine whether the third party is focusing on and/or attempting to look at the clarified portion of the sensitive data (return 1114).

In response to determining that the third party is not focusing on and/or attempting to look at or is no longer focusing on and/or attempting to look at the clarified portion of the sensitive data (e.g., a "NO" in block 1110), the processor 108 can maintain the clarity of or re-clarify the portion of the sensitive data (block 1116). The processor 108 can then continue to determine whether the third party is focusing on and/or attempting to look at the clarified portion of the sensitive data (return 1118).

The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
   a learning module that, via machine learning, identifies:
      a set of insensitive data and a set of sensitive data within a data block, and
      at least a first portion of the sensitive data and a second portion of the sensitive data;
   a display module that:
      continuously displays the set of insensitive data on a display of a computing device, and
      selectively obscures and displays the first portion and the second portion of the sensitive data on the display;
   a sensing module that detects where a user is focusing on the display; and
   a security module that, in the display of the computing device:
      obscures the first portion and the second portion of the sensitive data, in response to the user not focusing on the first portion and the second portion of the sensitive data,
      clarifies the obscurity of the first portion of the sensitive data, maintains the obscurity of the second portion of the sensitive data, and continues to display all of the insensitive data, in response to the user focusing on the first portion of the sensitive data, and
      clarifies the obscurity of the second portion of the sensitive data, maintains the obscurity of the first portion of the sensitive data, and continues to display all of the insensitive data, in response to the user focusing on the second portion of the sensitive data,
   wherein:
      the first portion of the sensitive data and a first portion of the insensitive data are located in a first same portion of the data block,
      the second portion of the sensitive data and a second portion of the insensitive data are located in a second same portion of the data block, and
      at least a portion of each of said modules comprises one or more of a set of hardware circuits, a set of programmable hardware devices, and
   a set of non-transitory computer-readable storage media storing executable code defining said modules.

2. The apparatus of claim 1, wherein:
   the sensing module is further configured to detect when the user is no longer focusing on the first portion or the second portion of the sensitive data; and
   the security module is further configured to return the obscurity to the first portion or the second portion of the sensitive data in response to the user no longer focusing on the first portion or the second portion of the sensitive data.

3. The apparatus of claim 1, wherein:
the learning module is configured to automatically identify the set of sensitive data and the set of insensitive data within the data block, and
the display module is further configured to, by default, continuously display the set of insensitive data and obscurely display the set of sensitive data.

4. The apparatus of claim 3, wherein:
the sensing module is configured to detect when the user is focusing on one of the first portion of the sensitive data and the second portion of the sensitive data; and
the security module is further configured to:
    selectively clarify the obscurity of the first portion of the sensitive data and selectively maintain the obscurity of the second portion of the sensitive data in response to the user focusing on the first portion of the sensitive data, and
    selectively clarify the obscurity of the second portion of the sensitive data and selectively maintain the obscurity of the first portion of the sensitive data in response to the user focusing on the second portion of the sensitive data.

5. The apparatus of claim 1, wherein:
the sensing module is further configured to detect when a third party is focusing on the display; and
the security module is further configured to return the obscurity to any portion of the displayed set of sensitive data in response to the third party focusing on the display.

6. The apparatus of claim 5, wherein:
the sensing module is further configured to detect when the third party is no longer focusing on the display; and
the security module is further configured to return the clarity to each portion of the displayed set of sensitive data in response to the third party no longer focusing on the display.

7. The apparatus of claim 1, wherein:
the sensing module is further configured to detect when a third party coexists in an environment with the display; and
the security module is further configured to:
    maintain the obscurity of each portion of the sensitive data in response to detecting that the third party coexists in the environment with the display, and
    clarify the obscurity of each portion of the displayed set of sensitive data upon which the user is focusing in response to the user focusing on the displayed set of sensitive data and detecting that the third party does not coexist in the environment with the display.

8. A method, comprising:
identifying, by a processor via machine learning:
    a set of insensitive data and a set of sensitive data within a data block, and
    at least a first portion of the sensitive data and a second portion of the sensitive data;
continuously displaying the set of insensitive data on a display of a computing device;
selectively obscuring and displaying the first portion and the second portion of the sensitive data on the display;
determining where a user is focusing on the display;
obscuring, in the display of the computing device, the first portion and the second portion of the sensitive data, in response to the user not focusing on the first portion and the second portion of the sensitive data;
clarifying, in the display of the computing device, the obscurity of the first portion of the sensitive data, maintaining the obscurity of the second portion of the sensitive data, and continuing to display all of the insensitive data, in response to determining that the user focusing on the first portion of the sensitive data; and
clarifying, in the display of the computing device, the obscurity of the second portion of the sensitive data, maintaining the obscurity of the first portion of the sensitive data, and continuing to display all of the insensitive data, in response to the user focusing on the second portion of the sensitive data,
wherein:
    the first portion of the sensitive data and a first portion of the insensitive data are located in a first same portion of the data block, and
    the second portion of the sensitive data and a second portion of the insensitive data are located in a second same portion of the data block.

9. The method of claim 8, further comprising:
determining that the user is no longer focusing on the first portion or the second portion of the sensitive data; and
in response to determining that the user no longer focusing on the first portion or the second portion of the sensitive data, returning the obscurity to the first portion or the second portion of the sensitive data.

10. The method of claim 8, wherein:
identifying the set of sensitive data and the set of insensitive data within the data block comprises automatically identifying the set of sensitive data and the set of insensitive data; and
continuously displaying the set of insensitive data and obscurely displaying the set of sensitive data is performed by default.

11. The method of claim 10, further comprising:
determining whether the user is focusing on one of the first portion of the sensitive data and the second portion of the sensitive data;
selectively clarifying the obscurity of the first portion of the sensitive data and selectively maintaining the obscurity of the second portion of the sensitive data in response to determining that the user is focusing on the first portion of the sensitive data, and
selectively clarifying the obscurity of the second portion of the sensitive data and selectively maintaining the obscurity of the first portion of the sensitive data in response to determining that the user is focusing on the second portion of the sensitive data.

12. The method of claim 8, further comprising:
determining that a third party is focusing on the display; and
in response to determining that the third party focusing on the display, returning the obscurity to any portion of the displayed set of sensitive data.

13. The method of claim 12, further comprising:
determining when the third party is no longer focusing on the display; and
in response to determining that the third party is no longer focusing on the display, returning the clarity to each portion of the displayed set of sensitive data.

14. The method of claim 8, further comprising:
determining that a third party coexists in an environment with the display;
in response to determining that the third party coexists in the environment with the display, maintaining the obscurity of each portion of the sensitive data; and
in response to determining that the user is focusing on the displayed set of sensitive data and that the third party does not coexist in the environment with the display, clarifying the obscurity of each portion of the displayed set of sensitive data upon which the user is focusing.

15. A computer program product comprising a computer-readable storage medium including program instructions embodied therewith, the program instructions executable by a processor to cause the processor to:
- identifying, via machine learning:
  - a set of insensitive data and a set of sensitive data within a data block, and
  - at least a first portion of the sensitive data and a second portion of the sensitive data;
- continuously display the set of insensitive data on a display of a computing device;
- selectively obscure and display the first portion and the second portion of the sensitive data on the display;
- determine where a user is focusing on the display;
- obscure, in the display of the computing device, the first portion and the second portion of the sensitive data, in response to the user not focusing on the first portion and the second portion of the sensitive data;
- clarify, in the display of the computing device, the obscurity of the first portion of the sensitive data, maintain the obscurity of the second portion of the sensitive data, and continue to display all of the insensitive data, in response to determining that the user focusing on the first portion of the sensitive data; and
- clarify, in the display of the computing device, the obscurity of the second portion of the sensitive data, maintain the obscurity of the first portion of the sensitive data, and continue to display all of the insensitive data, in response to the user focusing on the second portion of the sensitive data,
- wherein:
  - the first portion of the sensitive data and a first portion of the insensitive data are located in a first same portion of the data block, and
  - the second portion of the sensitive data and a second portion of the insensitive data are located in a second same portion of the data block.

16. The computer program product of claim 15, wherein the program instructions further cause the processor to:
- determine that the user is no longer focusing on the first portion or the second portion of the sensitive data; and
- return the obscurity to the first portion or the second portion of the sensitive data in response to determining that the user is no longer focusing on the first portion or the second portion of the sensitive data.

17. The computer program product of claim 15, wherein the program instructions further cause the processor to:
- determine whether the user is focusing on one of the first portion of the sensitive data and the second portion of the sensitive data;
- selectively clarify the obscurity of the first portion of the sensitive data and selectively maintain the obscurity of the second portion of the sensitive data in response to determining that the user is focusing on the first portion of the sensitive data, and
- selectively clarify the obscurity of the second portion of the sensitive data and selectively maintain the obscurity of the first portion of the sensitive data in response to determining that the user is focusing on the second portion of the sensitive data.

18. The computer program product of claim 15, wherein the program instructions further cause the processor to:
- determine that a third party is focusing on the display; and
- return the obscurity to any portion of the displayed set of sensitive data in response to determining that the third party focusing on the display.

19. The computer program product of claim 18, wherein the program instructions further cause the processor to:
- determine when the third party is no longer focusing on the display; and
- return the clarity to each portion of the displayed set of sensitive data upon which the user is focusing in response to determining that the third party is no longer focusing on the display.

20. The computer program product of claim 18, wherein the program instructions further cause the processor to:
- determine that a third party coexists in an environment with the display;
- maintain the obscurity of each portion of the sensitive data in response to determining that the third party coexists in the environment with the display; and
- clarify the obscurity of each portion of the displayed set of sensitive data upon which the user is focusing in response to determining that the user is focusing on the displayed set of sensitive data and that the third party does not coexist in the environment with the display.

* * * * *